DEMODULATORS FOR AMPLITUDE MODULATED CURRENT PULSES

Filed Feb. 8, 1960

INVENTOR

THOMAS H. FLOWERS,

BY Hall & Houghton

ATTORNEY

United States Patent Office 3,110,867
Patented Nov. 12, 1963

3,110,867

DEMODULATORS FOR AMPLITUDE MODULATED CURRENT PULSES

Thomas Harold Flowers, London, England, assignor to Her Majesty's Postmaster General, London, England Filed Feb. 8, 1960, Ser. No. 7,381
Claims priority, application Great Britain Feb. 13, 1959
1 Claim. (Cl. 329—102)

Figures 1, 2, 3, 4, 5, 6:
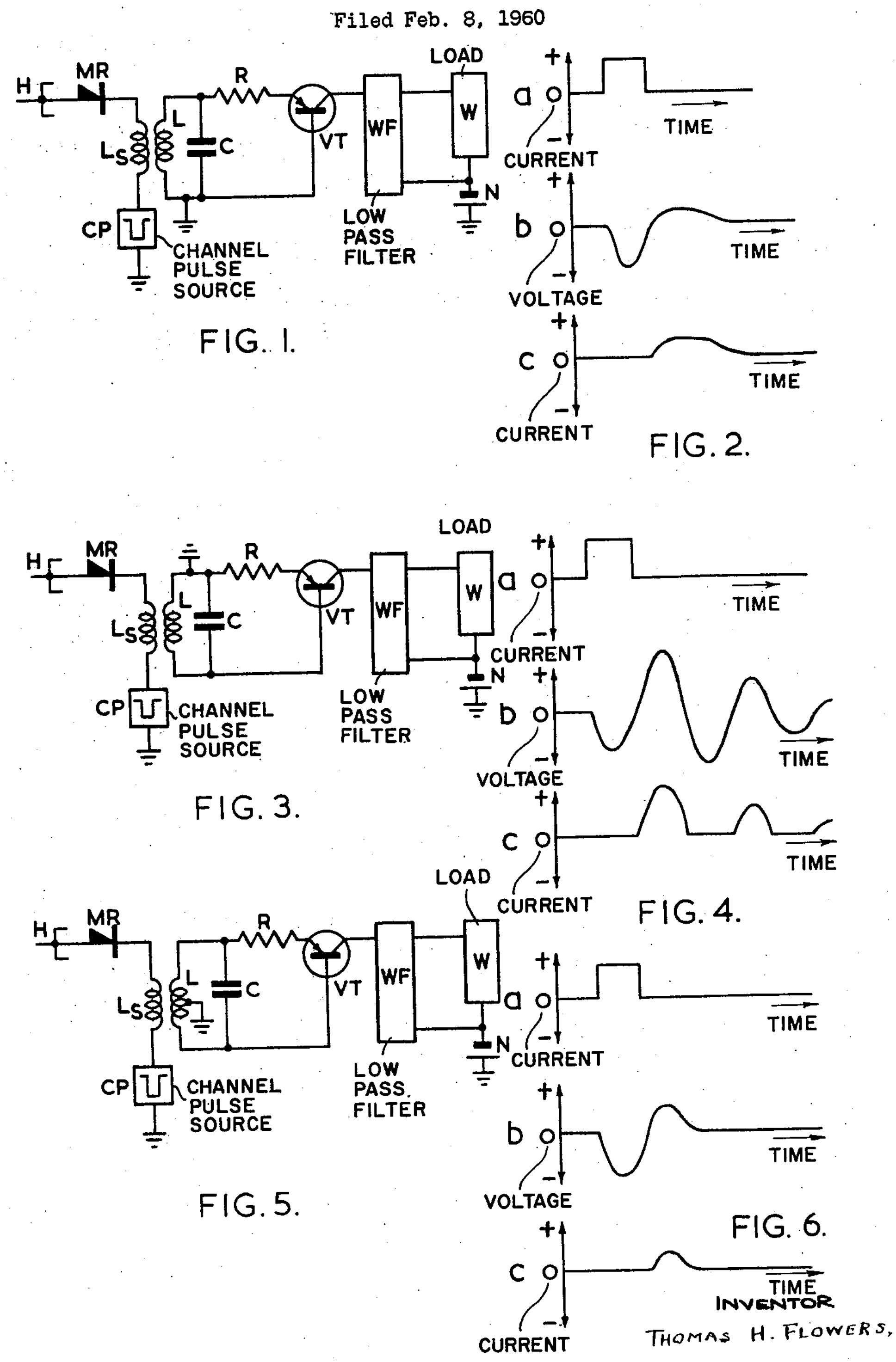

This invention relates to demodulators for amplitude modulated current pulses and particularly although not exclusively, to demodulators for use in electronic telephone exchanges employing time division multiplex.

The invention has application in demodulating amplitude modulated pulses generated by a modulator which, in the absence of modulating signals, produces constant amplitude current pulses.

A suitable modulator may comprise, for example, a core of readily saturable magnetic material having a substantially rectangular hysteresis loop characteristic and provided with a pair of audio-signal windings, a pair of bias windings, a pulse input winding and an output winding. The audio signal windings are series connected via a capacitor. The bias windings, two resistors and a D.C. bias source are series connected in a symmetrical arrangement, the free ends of the bias windings being connected to the respective free ends of the audio signal windings, which in turn are connected to a source of audio signals. This source completes a D.C. circuit and thereby providing a D.C. bias current path through these windings. The pulse input winding is connected through a current limiting resistor to a source of constant amplitude current pulses. The bias windings are arranged in series aiding relationship and the direct current passing through them saturates the core.

In the absence of an audio signal, current pulses from the pulse source produce pulses of constant current amplitude in the output winding. In the absence of a current pulse from the pulse source, an audio signal is not of sufficient amplitude to overcome the D.C. bias current, the core remains saturated and no pulse appears at the output winding.

In the presence of a current pulse applied to the pulse input winding, the D.C. bias current and an audio signal input, an output current pulse is induced in the output winding having an amplitude dependent upon the amplitude of the audio signal input.

The modulator described above may form part of an electronic telephone exchange terminal equipment and the pulse source referred to would then normally be associated with exchange equipment which controls setting up, maintaining and releasing a connection between a line connected to the audio signal windings and another line similarly terminated.

It is an object of the present invention to provide an improved apparatus for demodulating pulses of the kind referred to above.

According to the present invention, a demodulator of amplitude modulated current pulses includes a non-linear amplifier in parallel connection with a parallel resonant circuit comprising an inductor and a capacitor, the resonant circuit having a resonant frequency of at least half the reciprocal of the duration of each pulse, the arrangement being such that, in use, upon reception of an amplitude modulated pulse the resonant circuit is charged in such manner as to cause the amplifier to assume a condition of non-amplification and high input impedance, subsequent discharge of the resonant circuit causing the amplifier to assume a condition of amplication and lower input impedance.

In a particular demodulator embodying the invention, the non-linear amplifier may comprise a transistor amplifier, having the resonant circuit connected across its emitter and base electrodes. The inductor may be earthed at a point intermediate its two ends: advantageously this point may be such that the resonant circuit is critically damped. The modulated input pulses may be supplied to the resonant circuit via a further winding provided on the inductor.

By way of example demodulator circuits embodying the invention will now be described in greater detail, with reference to the accompanying drawings of which:

FIGURE 1 shows a circuit arrangement of a demodulator embodying the invention, and suitable for use as part of terminal equipment in an electronic exchange employing time division multiplex, FIGURE 2 shows current and voltage waveforms relating to FIGURE 1, FIGURE 3 shows a modified arrangement of the circuit shown in FIGURE 1, FIGURE 4 shows current and voltage waveforms relating to FIGURE 3, FIGURE 5 shows a further modification of the circuit shown in FIGURE 1 and FIGURE 6 shows waveforms relating to FIGURE 5 when the resonant circuit is critically damped.

In the following description the transistors referred to are of p-n-p type although it will be appreciated that other types, e.g. n-p-n transistors, may also be used, with appropriate supply and bias polarity charges where necessary.

Referring to FIGURE 1, a parallel resonant circuit LC is in parallel connection with a non-linear transistor amplifier VT which has its base electrode earthed. The transistor VT receives its input from the resonant circuit LC via a resistor R connected in series with the emitter electrode of the transistor. The inductor L is provided with a second winding $L_s$ serving to couple it to a source of channel pulses CP which produces negative going voltage pulses.

The winding $L_s$ is also connected via a rectifier MR to a source of amplitude modulated current pulses present on a highway H common to a number of demodulators. These pulses are substantially rectangular in shape, as shown in FIGURE 2*a* and are "positive" relative to the rectifier MR. The highway pulses have, in the case illustrated, a duration equal to half the resonant period of parallel resonant circuit LC. However, the duration may be longer. When a highway pulse and a channel pulse coincide the demodulator is isolated from other demodulators due to the biasing of the rectifiers of the other demodulators to a non-conducting state by the channel pulse. The highway pulse is then applied to the resonant circuit via rectifier MR and winding $L_s$, the inductor L and capacitor C then being charged in a direction to produce negative potential relative to earth at the emitter electrode of the transistor VT, which consequently remains in a high input impedance condition and does not conduct. At the end of a highway pulse the potential across the resonant circuit reverses and capacitor C and inductor L discharge into the emitter circuit of transistor VT so that the input impedance of the transistor drops to a low value allowing the transistor to conduct and amplification to occur. The voltage waveform across the resonant circuit is illustrated in FIGURE 2*b*. Current then flows in the collector circuit of the transistor as indicated in FIGURE 2*c*. This current will take the form of a series of somewhat lengthened pulses whose amplitude is proportional to the amplitude of the highway pulses. These amplified current pulses are fed to a low-pass filter WF which completes the demodulation process and the resultant audio frequency signals appear across a load impedance W. The collector of transistor VT is connected to a negative potential biasing source N via filter WF and load impedance W.

The resistor R in series with the emitter of transistor VT tends to stabilize the gain of the amplifier; in order to obtain sufficient amplification its value has to be kept low and thus the resonant circuit tends to be overdamped as illustrated by the waveform of voltage across the resonant circuit shown in FIGURE 2*b*. It will be noted from FIGURE 2*b* that the resonant period of the resonant circuit LC in this particular case is equal to twice the duration of a current pulse shown in FIGURE 2*a*.

The circuit shown in FIGURE 3 is identical to that of FIGURE 1 except that the transistor VT has its emitter earthed through resistor R and the input from the resonant circuit LC is applied to the base electrode of transistor VT. The circuit operates in a similar manner to the circuit shown in FIGURE 1. In this circuit arrangement the input impedance of the transistor in a conducting condition is much higher than in the circuit illustrated in FIGURE 1 where the base electrode is earthed and thus this higher input impedance tends to underdamp the resonant circuit. The result is that for a highway pulse input as shown in FIGURE 4*a* the voltage output from the resonant circuit LC is of the form shown in FIGURE 4*b*, that is of an oscillatory nature. The resultant collector current is illustrated in FIGURE 4*c*. FIGURE 4*b* shows, inter alia, that by making the resonant period of the resonant circuit LC equal to twice the highway pulse duration, the amplitude of the second half wave of voltage across the resonant circuit exceeds that of the first half wave. If the resonant circuit LC was entirely undamped the amplitude of the second halfwave under these conditions would be twice that of the first half wave.

The optimum circuit arrangement may be one having characteristics intermediate those of the circuits shown in FIGURES 1 and 3. Such characteristics may be obtained by using the circuit shown in FIGURE 5 which operates generally in the manner of the circuit shown in FIGURE 1. In the circuit shown in FIGURE 5, the earth connection of the circuit is made intermediate the two ends of inductor L. The resonant circuit thus may be arranged to be critically damped or slightly overdamped. For a highway current pulse as shown in FIGURE 6*a*, the resultant voltage across the resonant circuit is of the form shown in FIGURE 6*b* and the resultant collector current is illustrated in FIGURE 6*c*, for a condition of critical damping of the resonant circuit.

The presence of resistor R in the circuit is desirable in order to reduce the variations in the level of the demodulated signal due to variations in the characteristics of transistors from sample to sample and due to variations with temperature. Inaccuracies in the highway pulse width or resonant frequency of the resonant circuit may cause undesirable variation in the demodulated output but such variation is small for wide timing tolerances if the highway pulse duration exceeds the half period of the resonant circuit output.

The operation of the demodulator will be impaired if the transistor VT is allowed to reach a bottomed condition at any time. The filter and load impedances are therefore arranged to be sufficiently low to prevent this condition occurring at any part of the cycle.

I claim:

A demodulator of amplitude modulated current input pulses, comprising a transistor having base, emitter and collector electrodes; an inductor, a capacitor, means connecting the inductor in parallel with the capacitor to form a parallel resonant circuit having a resonant frequency equal to at least half the reciprocal of the duration of each input pulse; a resistor, means connecting the resistor in series with the emitter electrode to provide gain stabilization for the transistor; means connecting the parallel resonant circuit between the resistor and the base electrode to provide a base-emitter input circuit for the transistor; means grounding the base-emitter input circuit intermediate the ends of the inductor whereby the resonant circuit is critically damped; a unilateral conductive device, means coupling the unilateral conductive device to the inductor to provide a low impedance path for application of input pulses to the inductor whereby the resonant circuit oscillates to bias the transistor to a high-input-impedance non-conductive state for the duration of the first half-cycle of the oscillation and to bias the transistor to a low input impedance conductive condition during the second half-cycle of the oscillation to produce a collector signal having a magnitude dependent upon the magnitude of the input signal; and a collector circuit coupled to the collector electrode, the collector circuit including a low-pass filter.

References Cited in the file of this patent

UNITED STATES PATENTS

| | | |
|---|---|---|
| 2,582,271 | Page | Jan. 15, 1952 |
| 2,864,002 | Straube | Dec. 29, 1958 |
| 2,996,680 | Barry et al. | Aug. 15, 1961 |